April 14, 1931.  F. E. JOHNSTON  1,800,890
MACHINE FOR FORMING CATTLE FOOD INTO COMPRESSED BODIES
Filed Feb. 20, 1930
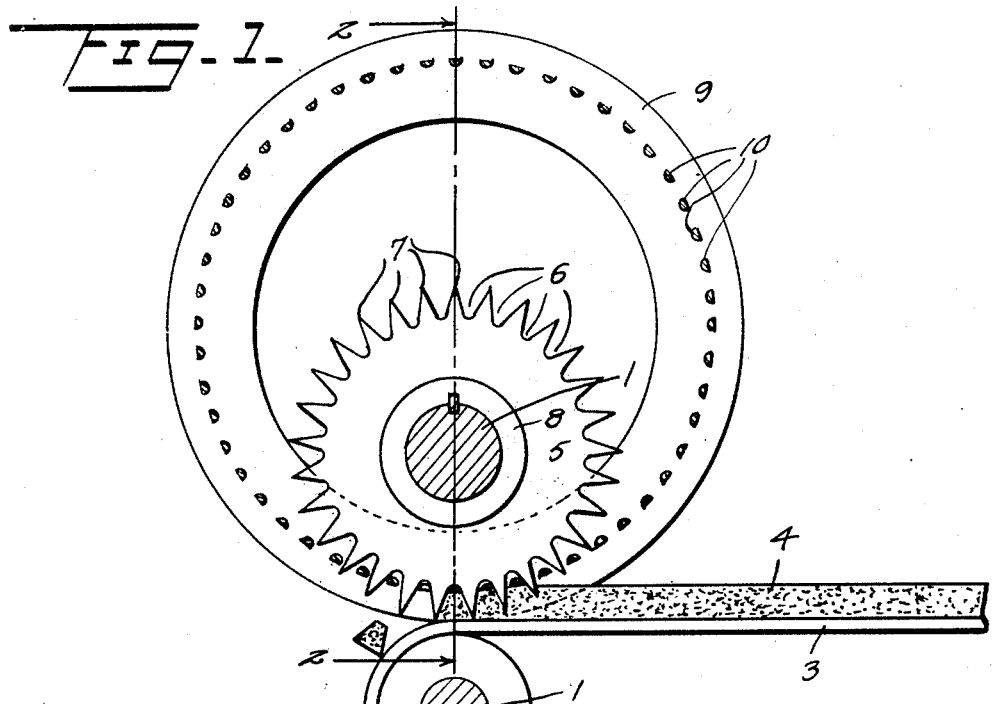
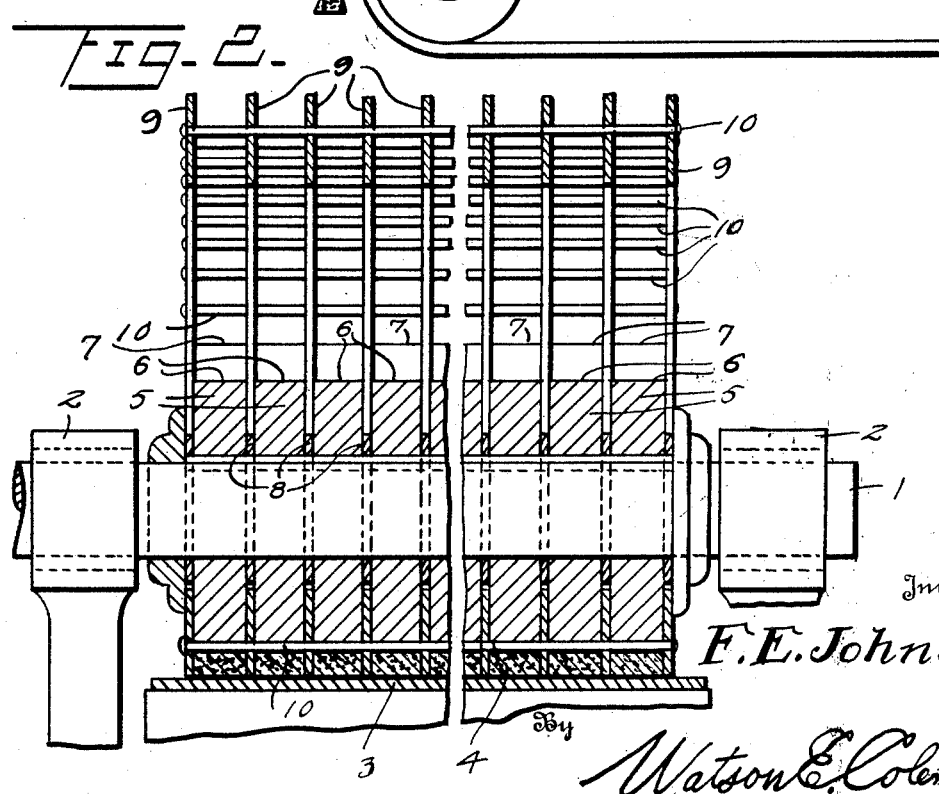
Inventor
F. E. Johnston
By Watson E. Coleman Patented Apr. 14, 1931

1,800,890

UNITED STATES PATENT OFFICE

FRANCIS E. JOHNSTON, OF ST. JOSEPH, MISSOURI

MACHINE FOR FORMING CATTLE FOOD INTO COMPRESSED BODIES

Application filed February 20, 1930. Serial No. 430,021.

This invention relates to improvements in machines for forming food mixtures, particularly cattle foods into particles of definite size and shape.

The primary object of the present invention is to provide a machine which will operate upon a sheet of a food composition or mixture fed thereto, to compress and cut the same into small bodies so that the food as prepared for serving to the cattle will be in the form of coarse particles which the cattle can readily pick up and chew.

Another object of the invention is to provide in a machine of the above described character improved means for moving the formed particles from the forming elements of the machine so that the machine may be operated continuously and without annoyance resulting from the clinging of the food particles thereto.

A still further object of the invention is to provide a novel means for controlling a series of annular cutting elements connected by axially parallel wires or bars which are employed for removing the formed food particles from recesses formed about the periphery of forming disks or wheels, the annular cutting disks being disposed between the forming disks.

The invention will be best understood from from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a transverse sectional view through a machine constructed in accordance with the present invention.

Figure 2 is a sectional view of the same taken substantially upon the line 2—2 of Figure 1.

Referring more particularly to the drawing wherein like numerals of reference indicate corresponding parts throughout the several views, the numeral 1 indicates a driving shaft which is supported in any convenient manner as for example by bearings 2 transversely of a suitable conveyor element 3 upon which the cattle food is fed in the form of a relatively wide ribbon of the desired thickness, the ribbon of food being here indicated by the numeral 4.

As is well known certain cattle foods are made up with a binder of heavy black molasses which forms such a large part of the food that it is hard to handle both in winter and in summer. In summer the food is sticky or gummy and in winter it becomes frozen unless it is kept stored in a proper place, so that it is sometimes necessary to chop it up before it can be fed to the cattle.

By suitably combining and mixing dry materials and heavy molasses and then passing it through rollers and tampers of any suitable type, the ribbon or sheet of food such as is indicated by the numeral 4 may be produced and conducted to and under the machine about to be described, this machine acting to form the ribbon or sheet of food into small uniform particles or bodies of sufficient hardness with the result that the food will not stick together in warm weather or freeze into a solid mass in cold weather.

Mounted upon the shaft 1 is a series of relatively broad forming disks each of which is indicated by the numeral 5. Each of these disks 5 has the periphery thereof formed to provide a plurality of transverse grooves 6, the dividing portions between the grooves being tapered off into relatively sharp points or edges 7 which readily penetrate the ribbon of food 4 in the manner illustrated.

These disks 5 are separated upon the shaft 1 in any suitable manner as for example by the interpositioning therebetween, of separating washers 8 or, of course, each of the disks may be provided on each face with a boss or shoulder through which the shaft 1 may extend, these shoulders of course coming into abutting relation when the disks are assembled.

Disposed between each pair of disks and adjacent the outer face of each end disk 5 is an annular cutting ring 9 which as shown in Figure 2 closes one end of one or more of the grooves 6 of an adjacent disk when the teeth at the opposite side of the groove penetrate the body of food 4 thus forming a portion of the food in the shape of the groove or recess 6 and of a length equal to the width of the forming disk.

The series of cutting rings 9 are connected by the axially parallel rods or wires 10 which are so spaced that each may take up a position in the crotch of a recess 6 of each disk 5 as it reaches the lowest point in its rotary movement with the rings to which it is attached. As will be readily seen from an inspection of Figure 2 each of the rods, when it comes to a position directly beneath the shaft 1, is firmly held in a crotch of a groove 6, of each disk, also directly beneath the shaft 1, and as this rod and groove each moves around its respective circle they will separate one from the other so that the rod will force from the groove the particle or body of food which has been compressed thereinto.

In addition to the rods 10 acting to force the formed bodies of food from the grooves 6 of the disks the teeth or portions 7 between the grooves of the disks engage between the rods and pull upon them and the attached cutting disks so that the necessary rotary movement is imparted to the cutting disks as will be readily understood.

From the foregoing description it will be readily seen that with a machine of the character herein described sheets or ribbons of food or other material fed thereto in this form may be readily cut up into blocks or bodies of the desired size and shape and in the forming of these bodies the machine will not become clogged or gummed up no matter how sticky the material worked upon may be. It will also be readily apparent that a machine of the character herein described may be easily and economically constructed, will be strong and durable and require little or no attention when in use.

Having thus described my invention, what I claim is:—

1. In a machine for forming cattle food into small compressed bodies, a plurality of peripherally transversely grooved rotating disks adapted to have the food passed therebeneath in the form of a flat ribbon, cutting elements surrounding the pivotal axis of and disposed between the disks for closing the ends of the grooves as the disks cut into the food, and means for forcibly removing the bodies of food from the grooves after being compressed therein.

2. In a machine for forming cattle food into small compressed bodies, a plurality of axially aligned disks, means for maintaining the disks in spaced relation, said disks having transversely extending peripheral grooves formed therein to receive the food material, annular cutting rings of a diameter materially greater than the disks, disposed between the disks and adapted to be rotated therewith, and means adapted to move into and out of the grooves of said disks for removing particles of food therefrom as the same are formed.

3. In a machine for forming cattle food into small compressed bodies, a plurality of axially aligned disks, means for maintaining the disks in spaced relation, said disks having transversely extending peripheral grooves formed therein to receive the food material, annular cutting rings of a diameter materially greater than the disks, disposed between the disks and adapted to be rotated therewith, and food particle removing bars connecting the cutting rings and extending axially of the disks and further adapted to enter aligned ones of the food particle forming grooves to position in the crotches thereof as the food is pressed thereinto and forcing the pressed food from the grooves as the disks and rings rotate.

4. In a machine for forming cattle food into small compressed bodies, a plurality of peripherally transversely grooved rotating disks adapted to have the food passed therebeneath in the form of a flat ribbon, cutting elements surrounding the pivotal axis of and disposed between the disks in contact with the side faces thereof for closing the ends of the grooves as the disks cut into the food, and members connecting said cutting elements for forcibly removing the bodies of food from the grooves of the disks after the same have been compressed therein.

In testimony whereof I hereunto affix my signature.

FRANCIS E. JOHNSTON.